April 5, 1927.
G. A. CURTIS
CLINCHING WIRE NAIL
Filed July 27, 1926
1,623,465
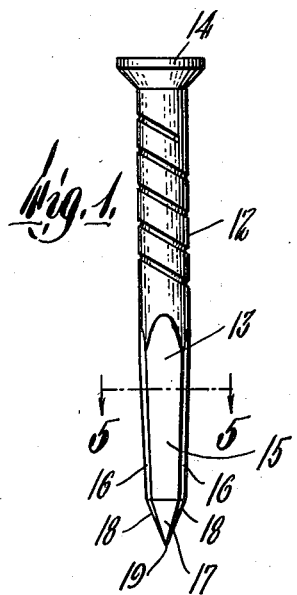
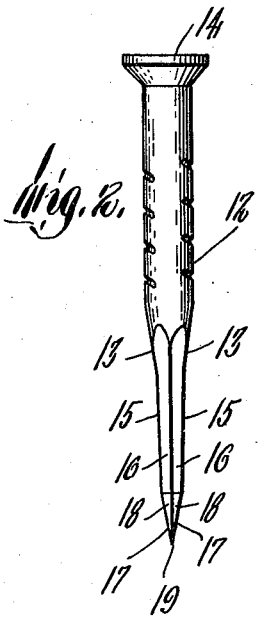
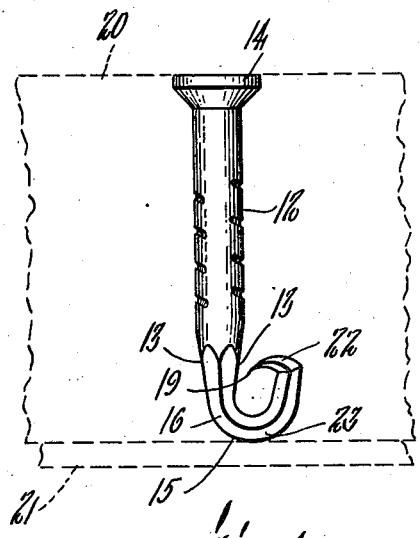
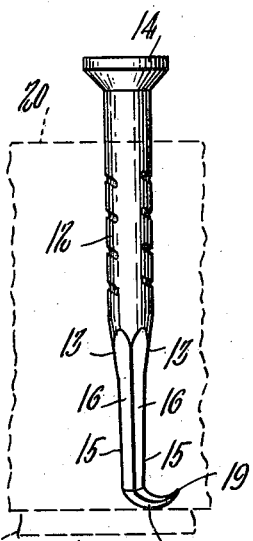
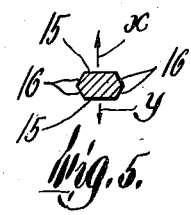
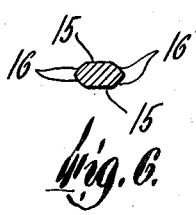
Inventor,
George A. Curtis,
by Hugh LoBrown Quinly May
Attys.

Patented Apr. 5, 1927.

1,623,465

UNITED STATES PATENT OFFICE.

GEORGE A. CURTIS, OF FRAMINGHAM, MASSACHUSETTS.

CLINCHING WIRE NAIL.

Application filed July 27, 1926. Serial No. 125,171.

This invention relates to wire nails such as those used by cobblers in repairing shoes and attaching rubber heels thereto. A wire nail suitable for these purposes comprises a headed shank portion whose diameter is that of the wire employed, and a clinching portion adapted to penetrate leather and to be bent into a hook by the driving of the nail through a leather article and against a clinching face, such as that of the metal bottom of a last.

The object of the invention is to provide a clinching wire nail provided with an inner and an outer clinching portion, the form of the nail being such that during the driving of the nail into the material supported by a clinching face, the outer clinching portion is abruptly bent before the bending of the inner clinching portion, to form a spur projecting angularly from the inner portion, the latter being then bent to form a hook from which the spur projects abruptly, and is firmly anchored in the material, to confine the hook against outward displacement.

Of the accompanying drawings forming a part of this specification,—

Figures 1 and 2 are side views, on an enlarged scale, of a nail embodying the invention.

Figure 3 shows the nail partly driven and provided with a spur.

Figure 4 shows the nail completely driven and provided with a hook from which the spur projects inwardly toward the shank portion.

Figure 5 is a section on line 5—5 of Figure 1.

Figure 6 is a view similar to Figure 5, showing a modification.

The same reference characters indicate the same parts in all of the figures.

The wire nail shown by the drawings comprises a headed shank portion 12, whose diameter is determined by that of the wire employed. The shank portion has at its inner extremity, two opposite side faces 13, 13, which converge toward the inner clinching portion hereinafter described, so that said extremity is tapered as shown by Figure 2.

The nail comprises also an inner clinching portion and an outer penetrating and clinching portion. The inner clinching portion is defined by two opposite relatively wide flat side faces 15, and narrower edge faces 16, between the side faces, the cross section of this portion being oblong as shown by Figure 5, and its cross sectional area being less than that of the shank portion. The side faces 15 merge into the side faces 13, and determine the direction in which the clinching portion is bent during the clinching operation. In other words, the oblong cross section of the inner clinching portion causes the bending of said portion in either of the directions indicated by the arrows $x$ and $y$ in Figure 5, no bending in other directions being caused by the clinching operation. The outer penetrating and clinching portion is defined by opposite triangular flat side faces 17, and narrower edge faces 18, between the side faces. The side faces 17 intersect the side faces 15 of the inner clinching portion at obtuse angles, and converge therefrom with the edge faces 18, to a penetrating point 19.

The flat side faces 15 of the inner clinching portion are parallel with each other in any cross section of said portion, so that the resistance to clinching force is not greater at the longitudinal center than at the edges of said faces. In other words, the side faces 15 are not transversely convex, as in the usual hold-fast clinching nail shown by my Patent No. 502,550. The parallelism of said faces causes accurate bending of the inner clinching portion in a predetermined direction, and permits such bending with only the resistance caused by the thickness of this portion, or the distance between its opposite flat faces, this resistance being greater in the inner than in the outer portion, because the inner portion is of substantial thickness at the point where it joins the outer portion.

The flat side faces 17 of the outer clinching portion are parallel with each other in any cross section of said portion, so that the resistance to clinching force is not greater at the longitudinal center than at the edges of said faces. Owing to the fact that the side faces 17 are inclined toward each other, the cross section of the outer clinching portion decreases from its junction with the inner portion to the point 19, so that the resistance to clinching force is less in all parts of the outer portion than in all parts of the inner portion, and decreases progressively from the junction of the outer portion with the inner portion, to the point 19.

In consequence of the difference between the outer and inner clinching portions as to resistance to clinching force, and of the dedescribed form and relative arrangement of the said portions, the operation of driving the nail into material 20, supported by a clinching face 21, abruptly bends the outer clinching portion in a predetermined direction, and forms, before the bending of the inner clinching portion, a spur 22 projecting abruptly from the inner clinching portion, as shown by Figure 3.

The driving of the nail to its final position shown by Figure 4, bends the inner clinching portion in the same direction as the spur, and converts said portion into a hook 23, from which the spur projects abruptly. The spur now has a firm bearing on the material in which it is embedded, the arrangement of the spur relative to the hook and the enclosing material being such that the hook is firmly anchored and cannot work outward.

The nail may be made from wire of any gage in common use, and may be of any desired length. The drawings show the nail much enlarged.

The edge faces 16 may be flat and form angles by their intersection with the flat side faces 15, as shown by Figure 5, or they may be curved and merge into the faces 15, as shown by Figure 6. The same may be said of the edge faces 18.

It will be seen that the illustrated form and relative arrangement of the two clinching portions, is such that when the nail is driven against a clinching surface, the outer portion is bent in a predetermined direction before the bending of the inner portion, and forms an anchoring spur projecting abruptly from the unbent inner portion, and the inner portion is then bent in the same direction and forms a hook from which the spur projects to anchor the hook in the material with which it is engaged, so that the hook cannot work outwardly from the material.

I claim:

A clinching wire nail comprising a headed shank portion whose diameter is determined by that of the wire, an inner clinching portion having relatively wide opposite sides and narrow intermediate edges, so that it is oblong in cross section, and adapted to be bent in a predetermined direction, and an outer clinching portion adapted to be bent in the same direction as the inner portion, the cross sections of the said portions differing, so that the outer portion is more easily bent than the inner portion, the outer portion having flat opposite sides, which join the sides of the inner portion, and narrow intermediate edges, the sides and edges of the outer portion converging to a penetrating point coaxial with the nail, the said sides being parallel with each other in any cross section of the outer portion, so that resistance to clinching force is not greater at the longitudinal center than at the edges, and inclined toward each other from the inner portion to the point, so that the outer portion may be clinched with relative ease, the form and relative arrangement of the clinching portions being such that when the nail is driven against a clinching surface, the outer portion is first bent in a predetermined direction and forms an anchoring spur projecting abruptly from the unbent inner portion, and the inner portion is then bent to a less degree in the same direction, and forms a hook from which the spur projects to anchor the hook in the material with which it is engaged.

In testimony whereof I have affixed my signature.

GEORGE A. CURTIS.